(12) United States Patent
Chen et al.

(10) Patent No.: US 12,306,457 B2
(45) Date of Patent: May 20, 2025

(54) LENS MODULE HAVING A VOICE COIL MOTOR AND ELECTRONIC DEVICE

(71) Applicant: TRIPLE WIN TECHNOLOGY (SHENZHEN) CO.LTD., Shenzhen (CN)

(72) Inventors: Shin-Wen Chen, New Taipei (TW); Long-Fei Zhang, Guangdong (CN); Kun Li, Guangdong (CN); Hao-Zhong Liu, Guangdong (CN)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 439 days.

(21) Appl. No.: 17/885,760

(22) Filed: Aug. 11, 2022

(65) Prior Publication Data

US 2023/0194829 A1    Jun. 22, 2023

(30) Foreign Application Priority Data

Dec. 17, 2021    (CN) .......................... 202111548579.1

(51) Int. Cl.
G02B 7/04    (2021.01)
(52) U.S. Cl.
CPC ..................................... *G02B 7/04* (2013.01)

(58) Field of Classification Search
CPC . G02B 7/04; G02B 7/021; G02B 7/09; G02B 15/14; G02B 13/002
USPC .......................................................... 359/822
See application file for complete search history.

(56) References Cited

U.S. PATENT DOCUMENTS

2006/0189183 A1\* 8/2006 Yang ................... H01R 13/6583
439/95
2020/0212603 A1\* 7/2020 Lin ......................... H05K 1/181

FOREIGN PATENT DOCUMENTS

TW    202026736 A    7/2020

\* cited by examiner

*Primary Examiner* — William R Alexander
(74) *Attorney, Agent, or Firm* — ScienBiziP, P.C.

(57) ABSTRACT

A lens module includes a lens assembly, a voice coil motor, a bracket, a circuit board, and a solder block. The voice coil motor includes a pin. The lens assembly is received in the voice coil motor. The bracket is disposed on the voice coil motor. The pin is extending into the recessed area. The bracket is sandwiched between the voice coil motor and the circuit board. The circuit board includes conductive supporting blocks facing the voice coil motor. The conductive supporting blocks are disposed in the recessed area. And one pin and one conductive supporting block are electrically connected by the solder block. The present disclosure also provides an electronic device including the lens module.

18 Claims, 5 Drawing Sheets

LENS MODULE HAVING A VOICE COIL MOTOR AND ELECTRONIC DEVICE

FIELD

The subject matter herein generally relates to electronics and optical devices, and more particularly, to a lens module and an electronic device.

BACKGROUND

A zoom lens module includes a circuit board, a bracket, a voice coil motor, and a lens, and the voice coil motor pushes and pulls the lens to achieve auto-focusing. The circuit board and the voice coil motor are disposed on two sides of the bracket. The bracket increases a distance between the voice coil motor and the circuit board, resulting in unreliable electrical connection between the voice coil motor and the circuit board. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
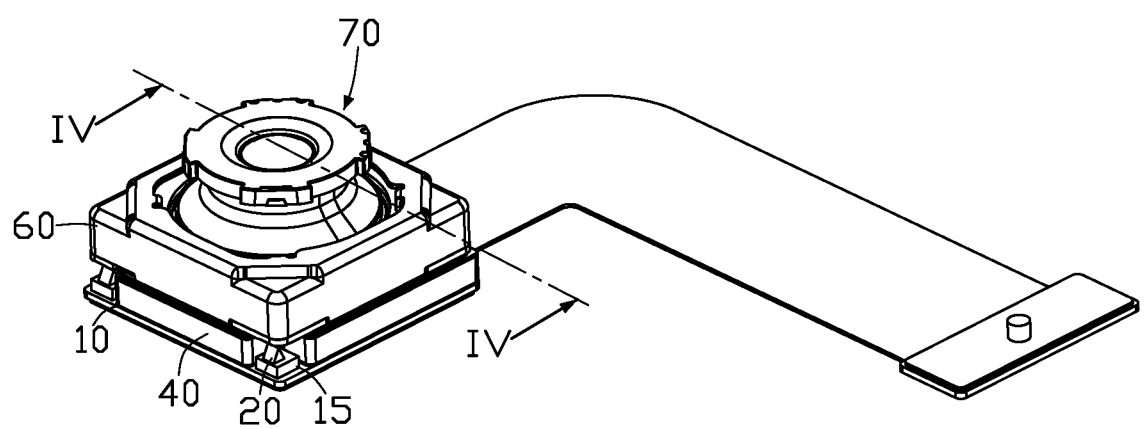
FIG. 1 is a diagrammatic view of an embodiment of a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
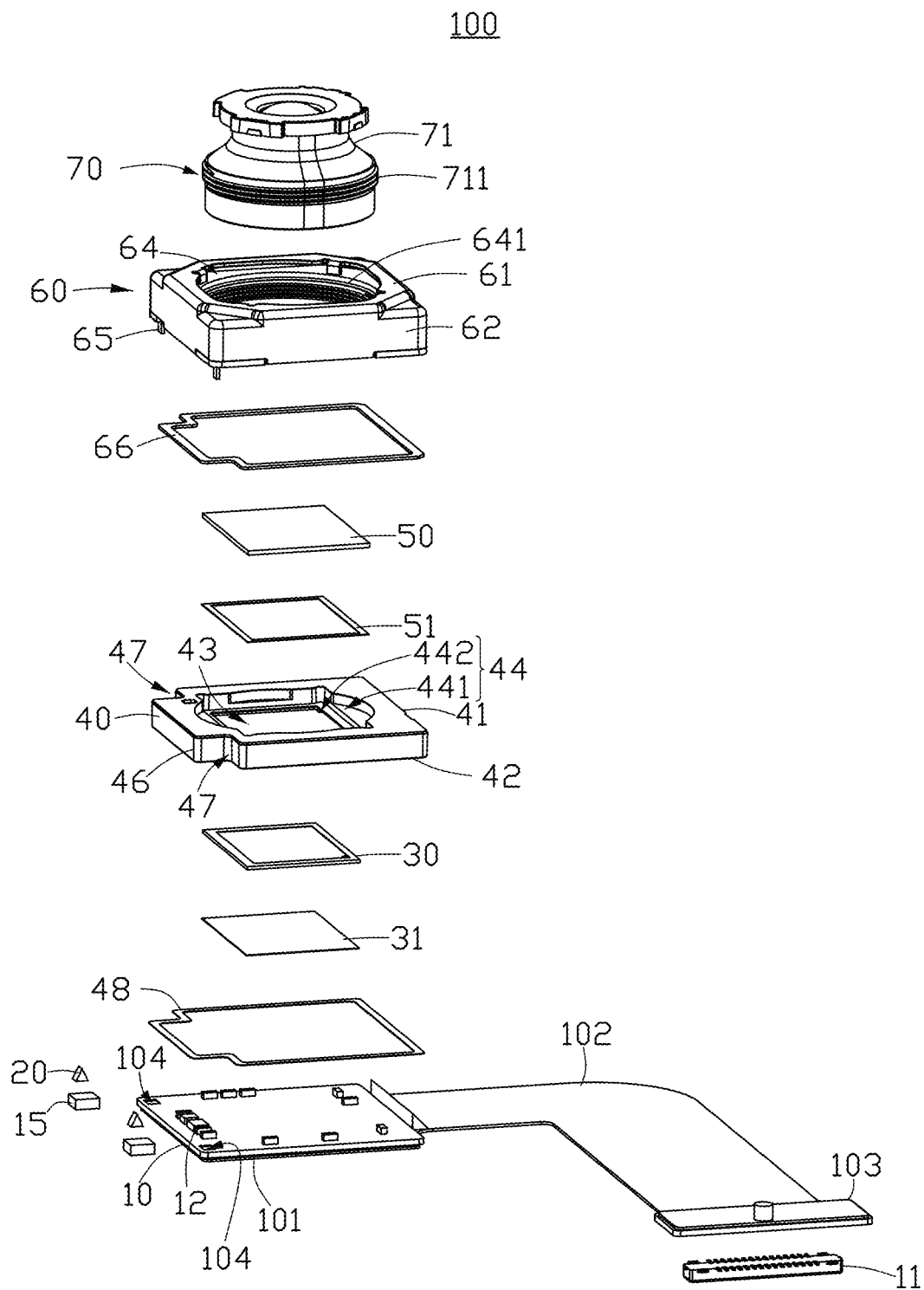
FIG. 2 is an exploded view of the lens module of FIG. 3.
Figure 3:
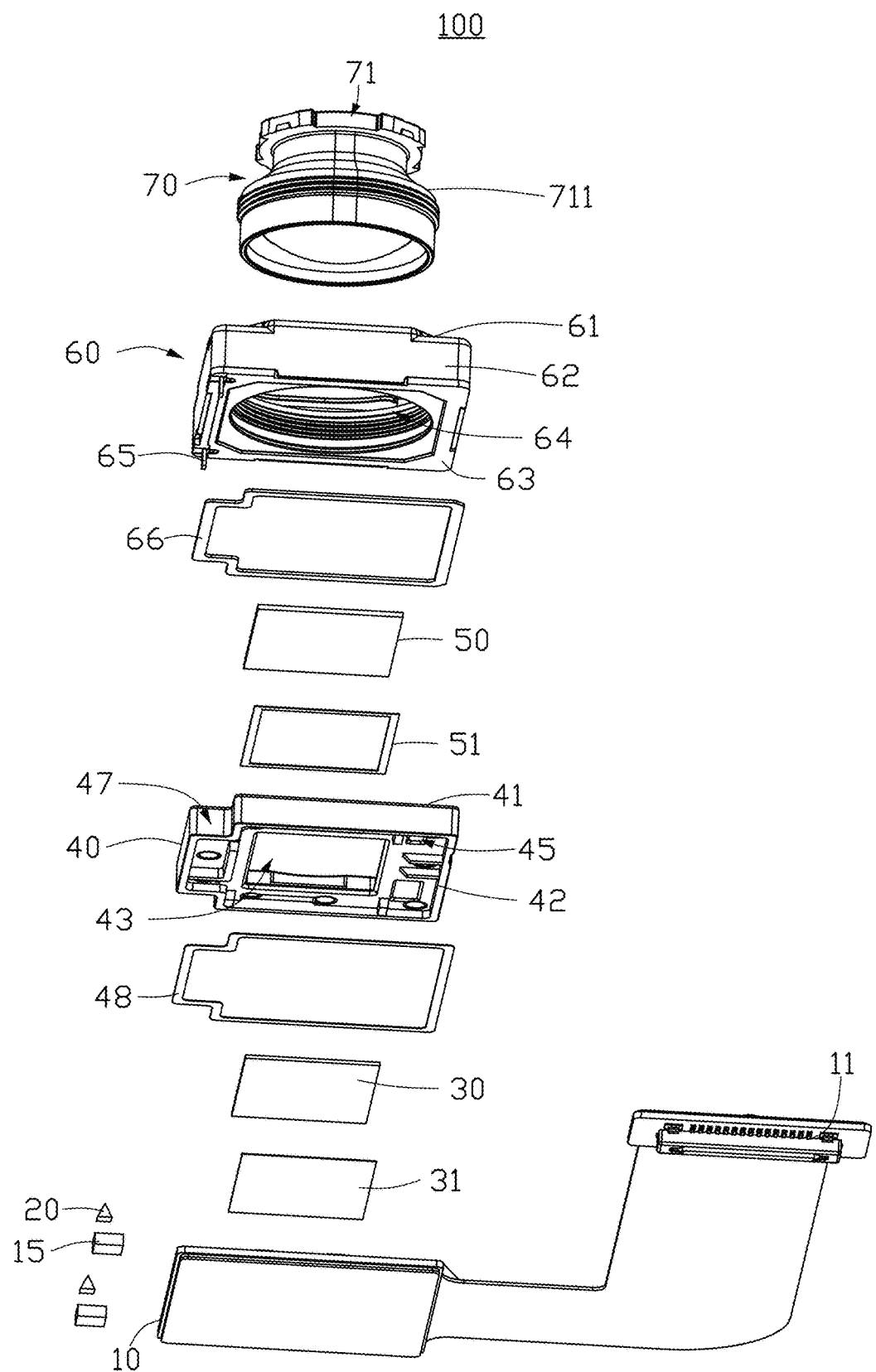
FIG. 3 is similar to FIG. 2, but showing the lens module from another angle.

Referring to FIGS. 1, 2, and 3, a lens module 100 is provided according to an embodiment of the present disclosure. The lens module 100 includes a circuit board 10, a photosensitive chip 30, a bracket 40, a filter 50, a voice coil motor 60, and a lens assembly 70.

Figure 4:
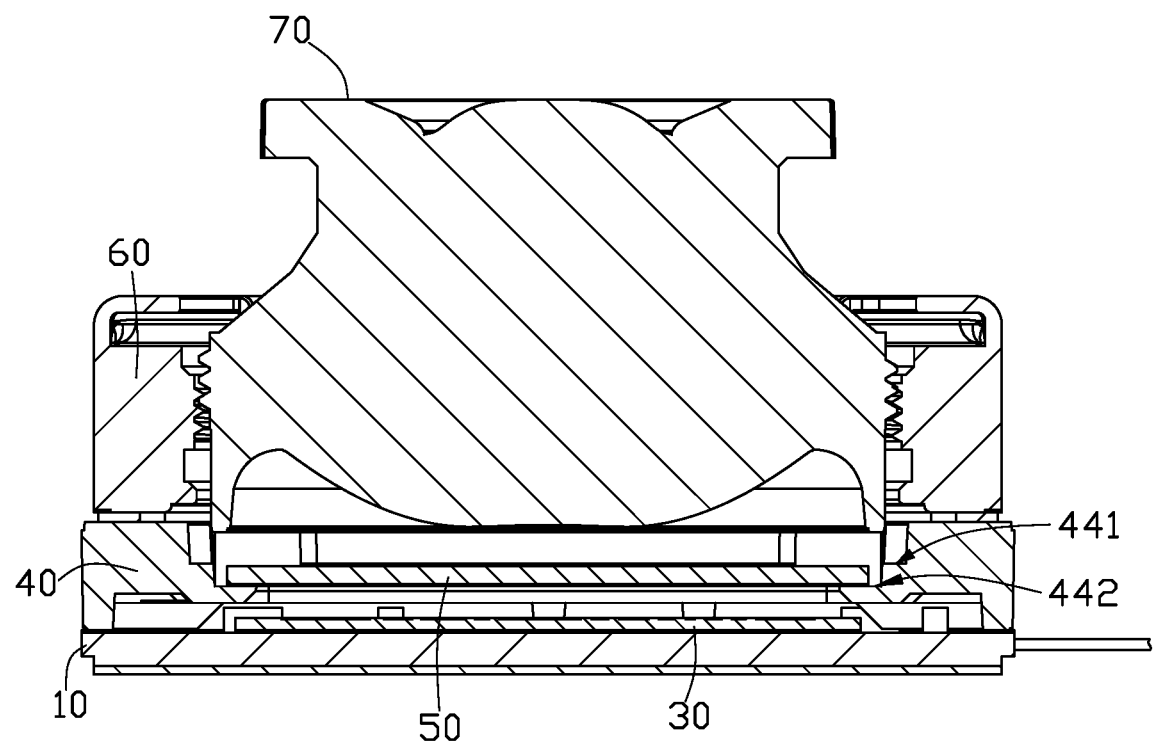
FIG. 4 is a cross-sectional view along line IV-IV in FIG. 1.

Referring to FIG. 4, the bracket 40 and the photosensitive chip 30 are disposed on a same surface of the circuit board 10. The voice coil motor 60 is disposed on a surface of the bracket 40 facing away from the circuit board 10. The filter 50 is disposed on the bracket 40 and faces the photosensitive chip 30. The lens assembly 70 is accommodated in the voice coil motor 60.

In the embodiment, the circuit board 10 is a rigid-flex board. The circuit board 10 includes a first hard board portion 101, a second hard board portion 103, a soft board portion 102, a connector 11, a conductive supporting block 15, and a plurality of electronic components 12. The soft board portion 102 is connected to the first hard board portion 101 and the second hard board portion 103, and the soft board portion 102 is substantially L-shaped. The electronic components 12 are disposed on the surface of the first hard board portion 101. The electronic components 12 may be passive components such as resistors, capacitors, diodes, triodes, relays, electrified erasable programmable read-only memories (EEPROMs). The connector 11 is disposed on the surface of the second hard board portion 103 and electrically connected to the second hard board portion 103. The connector 11 enables signal transmission between the lens module 100 and an external circuit (not shown).

The conductive supporting block 15 is disposed on the surface of the first hard board portion 101 and electrically connected to the first hard board portion 101. The conductive supporting block 15 is disposed at an edge region of the first hard board portion 101.

The conductive supporting block 15 is made of metal, such as at least one of gold, silver, copper, iron, and aluminum. The conductive supporting block 15 is electrically connected to the first hard board portion 101 through a conductive layer (not shown) such as conductive silver glue, conductive foam, or copper foil. The conductive layer electrically connects the conductive supporting block 15 to the first hard board portion 101. In the embodiment, the conductive supporting block 15 is made of copper.

A recessed portion 104 is defined on the first hard board portion 101. The recessed portion 104 is recessed from a surface of the first hard board portion 101 disposed the conductive supporting block 15 toward a direction away from the conductive supporting block 15. The conductive supporting block 15 covers the recessed portion 104. The recessed portion 104 can accommodate the conductive layer.

A thickness of the conductive supporting block 15 can be adjusted according to a distance between the circuit board 10 and the voice coil motor 60, and the conductive supporting block 15 can be used where the distance between the circuit board 10 and the voice coil motor 60 is relatively large. In some embodiments, the thickness of the conductive supporting block 15 is from 0.5 mm to 0.6 mm.

The photosensitive chip 30 and the electronic components 12 are disposed on the same surface of the first hard board portion 101. A first adhesive layer 31 is disposed between the photosensitive chip 30 and the first hard board portion 101. The first adhesive layer 31 bonds the photosensitive chip 30 and the first hard board portion 101. The photosensitive chip 30 receives light passing through the voice coil motor 60 and converts it into an electrical signal to form an image.

Referring to FIGS. 2, 3, and 4, a second adhesive layer 48 bonds the bracket 40 and the first hard board portion 101. The bracket 40, the photosensitive chip 30, and the electronic components 12 are disposed on the same surface of the first hard board portion 101. The bracket 40 is hollow and substantially rectangular. The bracket 40 includes a first surface 41, a second surface 42, and a plurality of side surfaces 46. The first surface 41 and the second surface 42 are spaced apart from each other. The side surfaces 46 are connected between the first surface 41 and the second surface 42. Referring to FIGS. 2, and 3, a junction between two adjacent side surfaces 46 is recessed inward to form a recessed area 47, and the conductive supporting block 15 is disposed in the recessed area 47.

A through hole 43 is defined on the bracket 40, and the through hole 43 penetrates through the first surface 41 and the second surface 42. A first groove 44 is formed by a portion of the first surface 41 around the through hole 43 being recessed toward the second surface 42. The first groove 44 includes an outer groove 441 and an inner groove 442. A bottom of the outer groove 441 is recessed toward the second surface 42 to form the inner groove 442. The inner groove 442 is substantially rectangular, and the filter 50 is disposed in the inner groove 442. The outer groove 441 is arc-shaped, and a portion of the lens assembly 70 protrudes from the voice coil motor 60 and is accommodated in the outer groove 441. Second grooves 45 are recessed inward along an outer edge of the second surface 42 for accommodating the electronic components 12 on the first hard board portion 101.

In the embodiment, the filter 50 is substantially rectangular. A third adhesive layer 51 is further provided between the filter 50 and the inner groove 442 to connect the two.

Referring to FIGS. 2, and 3, the voice coil motor 60 is disposed on the bracket 40 away from the circuit board 10. The voice coil motor 60 is hollow and substantially rectangular. The voice coil motor 60 includes a top plate 61, a bottom plate 63, and a plurality of side plates 62 perpendicularly connected between the top plate 61 and the bottom plate 63. The bottom plate 63 is connected to the bracket 40. A receiving hole 64 is defined on the voice coil motor 60. The receiving hole 64 penetrates the top plate 61 and the bottom plate 63, and the receiving hole 64 communicates with the through hole 43. An inner thread 641 is defined on an inner circumference of the receiving hole 64.

The lens assembly 70 is movably disposed in the receiving hole 64. The lens assembly 70 includes a lens barrel 71 and an optical lens group (not shown) accommodated in the lens barrel 71. An outer thread 711 is defined on an outer wall of the lens barrel 71, and the outer thread 711 can engage with the inner thread 641.

A plurality of pins 65 are disposed on one end of the side plates 62 away from the top plate 61, and the pins 65 are disposed on the junction of two adjacent side plates 62. The pins 65 are made of metal. In the embodiment, the pins 65 are made of gold-plated copper. One end of each of the pins 65 is connected to the side plates 62, and the other end protrudes from the side plates 62 and extends into the recessed areas 47. The lens module 100 further includes a solder block 20, and the pins 65 are electrically connected to the conductive supporting block 15 through the solder block 20, thereby enabling electrical connection between the voice coil motor 60 and the circuit board 10. In the embodiment, the solder block 20 is made of tin.

A quantity of the recessed areas 47 corresponds to a quantity of the pins 65. The quantity of the recessed areas 47 also corresponds to a quantity of the solder blocks 20. The quantity of the recessed areas 47 also corresponds to a quantity of the conductive supporting blocks 15. In the embodiment, there are two recessed areas 47, two pins 65, two solder blocks 20, and two conductive supporting blocks 15, and each of the two recessed areas 47 accommodates one of the two pins 65, one of the solder block 20, and one of the conductive supporting block 15.

A distance between the pins 65 and the circuit board 10 is from 0.7 mm to 0.75 mm.

The conductive supporting block 15 is provided between the circuit board 10 and the voice coil motor 60. During assembly of the lens module 100, the pins 65 on the voice coil motor 60 are reduced in height by contact with the conductive supporting block 15.

A distance between the conductive supporting block 15 and the pins 65 is from 0.1 mm to 0.25 mm. That is, the presence of the conductive supporting block 15 avoids difficulty of welding between the first hard plate portion 101 and the pins 65. The arrangement allows an automatic and convenient welding between the conductive supporting block 15 and the pins 65. That is, the electrical connection between the voice coil motor 60 and the circuit board 10 is completed without changing the original design of the voice coil motor 60, thereby improving the processing efficiency of the lens module 100 and reducing cost.

In the embodiment, the pins 65 are flat and strip-shaped. There are two pins 65, and the two pins 65 are symmetrically disposed. In other embodiments, the pins 65 may also be in other shapes such as cylinders, prisms, etc. The quantity of the pins 65 may be other than two, and the pins 65 may also be disposed at any position of the side plates 62.

A fourth adhesive layer 66 is further provided between the voice coil motor 60 and the bracket 40 to connect the two.

Figure 5:
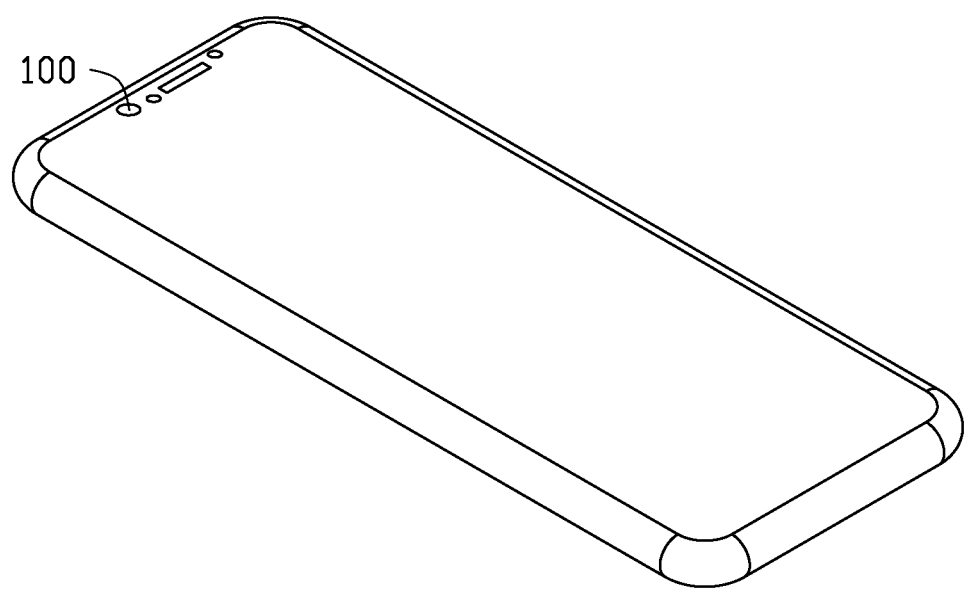
FIG. 5 is a diagrammatic view of another embodiment of a lens module according to the present disclosure.

Referring to FIG. 5, an electronic device 200 including the lens module 100 is further provided in the present disclosure. The electronic device 200 may be a mobile phone, a wearable device, a computer device, a vehicle, a monitoring device, or the like. In the embodiment, the electronic device 200 is a mobile phone.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module comprising:
a lens assembly;
a voice coil motor comprising a pin, the lens assembly being received in the voice coil motor;
a bracket disposed on the voice coil motor, the bracket defining a recessed area, the pin extending into the recessed area;
a circuit board disposed on the bracket, the bracket being sandwiched between the voice coil motor and the circuit board, the circuit board comprising a conductive supporting block disposed on a surface of the circuit board facing the voice coil motor, the conductive supporting block being disposed in the recessed area; and
a solder block electrically connecting the pin to the conductive supporting block;
wherein a recessed portion is defined on the surface of the circuit board facing the voice coil motor, and the conductive supporting block covers the recessed portion.

2. The lens module of claim 1, wherein a distance between the conductive supporting block and the pin is from 0.1 mm to 0.25 mm.

3. The lens module of claim 1, wherein a distance between the pin and the circuit board is from 0.7 mm to 0.75 mm, and a thickness of the conductive supporting block is from 0.5 mm to 0.6 mm.

4. The lens module of claim 1, wherein the conductive supporting block is made of at least one of gold, silver, copper, iron, and aluminum.

5. The lens module of claim 1, wherein the bracket comprises a first surface, a second surface, and a plurality of side surfaces; the first surface and the second surface are spaced apart from each other, the plurality of the side surfaces is connected between the first surface and the second surface; a junction between adjacent two of the plurality of side surfaces is recessed to form the recessed area.

6. The lens module of claim 5, wherein the circuit board comprises a first hard board portion, a second hard board portion, and a soft board portion connected between the first hard board portion and the second hard board portion, and the conductive supporting block is disposed on the first hard board portion.

7. The lens module of claim 6, wherein the bracket is disposed on the first hard board portion and defines a through hole, the through hole penetrates through the first surface and the second surface; a first groove is formed by a portion of the first surface around the through hole being recessed toward the second surface; the lens module further comprises a filter, and the filter is disposed in the first groove.

8. The lens module of claim 7, wherein a receiving hole is defined on the voice coil motor, the receiving hole communicates with the through hole, the lens assembly is configured to be movably disposed in the receiving hole.

9. The lens module of claim 7, wherein the circuit board further comprises a plurality of electronic components disposed on the first hard board portion facing the bracket; a plurality of second grooves is recessed along an outer edge of the second surface for accommodating the plurality of electronic components; the circuit board further comprises a connector disposed on the first hard board portion.

10. An electronic device comprising:
a lens module comprising:
a lens assembly;
a voice coil motor comprising a pin, the lens assembly being received in the voice coil motor;
a bracket disposed on the voice coil motor, the bracket defining a recessed area, the pin extending into the recessed area;
a circuit board disposed on the bracket, the bracket being sandwiched between the voice coil motor and the circuit board, the circuit board comprising a conductive supporting block disposed on a surface of the circuit board facing the voice coil motor, the conductive supporting block being disposed in the recessed area; and
a solder block electrically connecting the pin to the conductive supporting block;
wherein a recessed portion is defined on the surface of the circuit board facing the voice coil motor, and the conductive supporting block covers the recessed portion.

11. The lens module of claim 10, wherein a distance between the conductive supporting block and the pin is from 0.1 mm to 0.25 mm.

12. The lens module of claim 10, wherein a distance between the pin and the circuit board is from 0.7 mm to 0.75 mm, and a thickness of the conductive supporting block is from 0.5 mm to 0.6 mm.

13. The lens module of claim 10, wherein the conductive supporting block is made of at least one of gold, silver, copper, iron, and aluminum.

14. The lens module of claim 10, wherein the bracket comprises a first surface, a second surface, and a plurality of side surfaces; the first surface and the second surface are spaced apart from each other, the plurality of the side surfaces is connected between the first surface and the second surface; a junction between adjacent two of the plurality of side surfaces is recessed to form the recessed area.

15. The lens module of claim 14, wherein the circuit board comprises a first hard board portion, a second hard board portion, and a soft board portion connected between the first hard board portion and the second hard board portion, and the conductive supporting block is disposed on the first hard board portion.

16. The lens module of claim 15, wherein the bracket is disposed on the first hard board portion and defines a through hole, the through hole penetrates through the first surface and the second surface; a first groove is formed by a portion of the first surface around the through hole being recessed toward the second surface; the lens module further comprises a filter, and the filter is disposed in the first groove.

17. The lens module of claim 16, wherein a receiving hole is defined on the voice coil motor, the receiving hole communicates with the through hole, the lens assembly is configured to be movably disposed in the receiving hole.

18. The lens module of claim 16, wherein the circuit board further comprises a plurality of electronic components disposed on the first hard board portion facing the bracket; a plurality of second grooves is recessed along an outer edge of the second surface for accommodating the plurality of electronic components; the circuit board further comprises a connector disposed on the first hard board portion.

* * * * *